(12) United States Patent
Honsel

(10) Patent No.: US 12,123,722 B2
(45) Date of Patent: Oct. 22, 2024

(54) DRIVER ASSISTANCE SYSTEM AND METHOD

(71) Applicant: ARRIVER SOFTWARE AB, Linköping (SE)

(72) Inventor: Hendrik Honsel, Munich (DE)

(73) Assignee: Arriver Software AB, Linköping (SE)

( * ) Notice: Subject to any disclaimer, the term of this patent is extended or adjusted under 35 U.S.C. 154(b) by 78 days.

(21) Appl. No.: 17/976,477

(22) Filed: Oct. 28, 2022

(65) Prior Publication Data

US 2023/0047404 A1 Feb. 16, 2023

Related U.S. Application Data

(63) Continuation of application No. 16/627,904, filed as application No. PCT/EP2018/068155 on Jul. 4, 2018, now Pat. No. 11,550,330.

(30) Foreign Application Priority Data

Jul. 12, 2017 (EP) ..................................... 17181013

(51) Int. Cl.
*G01C 21/16* (2006.01)
*B60W 60/00* (2020.01)
(Continued)

(52) U.S. Cl.
CPC ....... *G01C 21/1656* (2020.08); *B60W 60/001* (2020.02); *G01C 21/1652* (2020.08);
(Continued)

(58) Field of Classification Search
None
See application file for complete search history.

(56) References Cited

U.S. PATENT DOCUMENTS 8,725,412 B2 5/2014 Kobori et al.
9,650,337 B2 5/2017 Boiteau et al.
(Continued)

FOREIGN PATENT DOCUMENTS

CN 101473195 A 7/2009
CN 101476891 A 7/2009
(Continued)

OTHER PUBLICATIONS

Aron M., et al., "Use of Inertial sensors to Support Video Tracking", Jan. 2007, Computer Animation and virtual worlds, vol. 18, iss 1, pp. 57-68, https://citeseerx.ist.psu.edu/viewdoc/download?doi=10.1.1.163.4384&rep=rep1&type=pdf (Year: 2007).
(Continued)

*Primary Examiner* — David P. Merlino
(74) *Attorney, Agent, or Firm* — Arriver Software AB

(57) ABSTRACT

A driver assistance system for an ego vehicle, and a method for a driver assistance system is provided. The system is configured to refine a coarse geolocation method based on the detection of the static features located in the vicinity of the ego vehicle. The system performs at least one measurement of the visual appearance of each of at least one static feature located in the vicinity of the ego vehicle. Using the at least one measurement, a position of the ego vehicle relative to the static feature is calculated. The real world position of the static feature is identified. The position of the ego vehicle relative to the static feature is calculated, which is, in turn, used to calculate a static feature measurement of the vehicle location. The coarse geolocation measurement and the static feature measurement are combined to form a fine geolocation position. By combining the measurements, a more accurate location of the ego vehicle can be determined.

20 Claims, 8 Drawing Sheets

(51) Int. Cl.
  *G01C 21/36* (2006.01)
  *G01S 19/48* (2010.01)
  *G05D 1/00* (2006.01)
  *G08G 1/16* (2006.01)

(52) U.S. Cl.
  CPC .......... *G01C 21/3644* (2013.01); *G01S 19/48* (2013.01); *G05D 1/0231* (2013.01); *G08G 1/167* (2013.01); *B60W 2420/403* (2013.01); *B60W 2552/53* (2020.02); *B60W 2554/20* (2020.02)

(56) References Cited

U.S. PATENT DOCUMENTS

| | | |
|---|---|---|
| 9,921,585 B2 | 3/2018 | Ichikawa et al. |
| 10,118,614 B2 | 11/2018 | Delp |
| 10,366,204 B2 | 7/2019 | Tanner, Jr. et al. |
| 10,447,480 B2 | 10/2019 | Alas et al. |
| 10,579,779 B2 | 3/2020 | Wright et al. |
| 2006/0233424 A1 | 10/2006 | Miyajima et al. |
| 2010/0004856 A1 | 1/2010 | Kobori et al. |
| 2010/0061591 A1 | 3/2010 | Okada et al. |
| 2015/0081211 A1 | 3/2015 | Zeng et al. |
| 2015/0316386 A1 | 11/2015 | Delp |
| 2015/0316387 A1 | 11/2015 | Ichikawa et al. |
| 2015/0376126 A1 | 12/2015 | Boiteau et al. |
| 2016/0221592 A1 | 8/2016 | Puttagunta et al. |
| 2016/0257307 A1 | 9/2016 | Delp |
| 2016/0282879 A1 | 9/2016 | Ichikawa et al. |
| 2017/0016740 A1 | 1/2017 | Cui et al. |
| 2017/0032676 A1 | 2/2017 | Mesmakhosroshahi et al. |
| 2017/0038477 A1* | 2/2017 | Schmid .................. G01S 19/51 |
| 2017/0039330 A1 | 2/2017 | Tanner, Jr. et al. |
| 2018/0045519 A1 | 2/2018 | Ghadiok et al. |
| 2018/0189312 A1 | 7/2018 | Alas et al. |
| 2018/0336421 A1* | 11/2018 | Huang .................. G05D 1/0274 |
| 2019/0163883 A1 | 5/2019 | Savanah et al. |
| 2019/0295420 A1 | 9/2019 | Fu |
| 2019/0303543 A1 | 10/2019 | Savanah et al. |
| 2019/0340362 A1 | 11/2019 | Wright et al. |
| 2020/0257775 A1 | 8/2020 | Wright et al. |
| 2021/0149409 A1 | 5/2021 | Honsel |
| 2021/0199437 A1* | 7/2021 | Breed .................. G06N 3/02 |

FOREIGN PATENT DOCUMENTS

| | | |
|---|---|---|
| CN | 103207634 A | 7/2013 |
| CN | 103879406 A | 6/2014 |
| CN | 104024880 A | 9/2014 |
| CN | 105044757 A | 11/2015 |
| CN | 105489035 A | 4/2016 |
| CN | 105676253 A | 6/2016 |
| CN | 106352867 A | 1/2017 |
| CN | 106546977 A | 3/2017 |
| EP | 2034271 A1 | 3/2009 |

OTHER PUBLICATIONS

European Search Report—EP17181013—Search Authority—The Hague—Apr. 26, 2018.
International Preliminary Report on Patentability—PCT/EP2018/068155, The International Bureau of WIPO—Geneva, Switzerland, Jan. 23, 2020.
International Search Report and Written Opinion—PCT/EP2018/068155—ISA/EPO—Nov. 26, 2018.
Partial European Search Report—EP17181013—Search Authority—The Hague—Jan. 12, 2018.

* cited by examiner

DRIVER ASSISTANCE SYSTEM AND METHOD

CROSS-REFERENCE TO RELATED APPLICATIONS

This application is a continuation of U.S. patent application Ser. No. 16/627,904 filed on Dec. 31, 2019 and entitled "A DRIVER ASSISTANCE SYSTEM AND METHOD," which is a 35 U.S.C. § 371 national phase of PCT International Patent Application No. PCT/EP2018/068155, filed Jul. 4, 2018, which claims the benefit of priority under 35 U.S.C. § 119 to European Patent Application No. 17181013.8, filed Jul. 12, 2017, the contents of each of which are incorporated herein by reference in their entireties.

FIELD OF THE INVENTION

The present invention relates to a driver assistance system and method, and more particularly a driver assistance system and method for improving a geolocation measurement of an ego vehicle.

BACKGROUND

In order that accidents are avoided and driving laws are complied with, driving a vehicle requires concentration from the driver, often for prolonged periods. Lapses in concentration from the driver lead to increased risk of accidents and/or non-compliance with the law. Increasingly, driver assistance systems that are capable of performing an assistance function are fitted to the driver's vehicle (hereinafter referred to as the "ego vehicle"). For example, the assistance function may include relieving the driver of some of his/her driving duties, or may include monitoring the driver's performance in order that errors may be anticipated and/or avoided.

Alternatively, the assistance function may introduce some additional functionality not ordinarily available to a driver. Such additional functionality may allow the driver to have more information than they ordinarily would do, in order that they can perform a driving task more easily. A rear-facing camera for example, which can provide a video feed to a driver when reversing, constitutes an example of such an additional functionality. In this example, the video feed allows the driver to reverse-park more easily and safely but is not actually necessarily monitoring the driver's performance or performing some task for them.

Driver assistance systems therefore mitigate risk for the driver of the ego vehicle, his/her passengers, and other road users. Ultimately, driver assistance functions will be developed to such an extent that they can control most or all aspects of driving an ego vehicle. In this case, the driver assistance system will be an autonomous driving system.

Driver assistance systems may include active devices, which are capable of actively intervening in the operation of the ego vehicle, for example by changing the speed of the ego vehicle. Driver assistance systems may alternatively or additionally include passive devices, which, for example, notify the driver of a particular driving situation so that the user can react to the notification. For example, the driver assistance system may make an audible signal when the ego vehicle deviates across a road marking unexpectedly. A given ego vehicle may include both passive and active systems.

In general, a driver assistance system may include at least one sensor. A particular sensor measures parameters of the vehicle and/or its surroundings. The data from such a sensor is processed in order to draw conclusions based on the sensor measurements. The driver assistance system may then trigger an interaction with the ego vehicle, or with the driver, based on the result of the conclusions. In the case of an autonomous driving system, substantially all driving functions are controlled by the system.

Examples of potential sensors used in driver assistance systems and autonomous driving systems include RADAR systems, LIDAR systems, cameras or camera, inter-vehicle communications, and vehicle-to-infrastructure communications.

A driver assistance system may be used to control a variety of different aspects of driving safety or driver monitoring. For example, ACC ("Adaptive Cruise Control") may use a RADAR or LIDAR system to monitor the distance between the ego vehicle and the vehicle immediately ahead on the road. Such a sensor is able to determine the distance to the vehicle ahead. The driver assistance system also knows, and can control, the velocity of the ego vehicle. The driver assistance system may control the speed of the ego vehicle in order to maintain a predefined safety condition relative to the vehicle ahead. For example, the driver assistance system may control the speed to maintain a certain distance between the ego vehicle and the vehicle ahead. Alternatively, the driver assistance system may control the speed to maintain a predetermined time-period between the vehicle ahead passing a point, and the ego vehicle passing the same point.

There are existing driving assistance systems that monitor the surroundings of the ego vehicle to identify the position of other vehicles and entities on or around the road on which the ego vehicle is travelling. By monitoring the surroundings, such a driver assistance system can maintain a situational awareness for the ego vehicle. This situational awareness can be used to notify the user of potential hazards. For example, the ego vehicle changing lanes when a second vehicle is in a blind spot, or detecting a second vehicle cutting-in to the path of the ego vehicle, may be notified to a driver. The situational awareness may also be used as an input to an ACC system, for example.

Providing a detailed and reliable situational awareness is important for a number of different driver assistance functionalities.

In the majority of driving situations, vehicles are travelling in lanes. That is, the road is split into a number of generally parallel lanes, each of which forms a corridor along which vehicles should travel. Sometimes the lanes are designated by road markings on the road surface, which visually indicate to a driver where the boundaries of the lanes are. Sometimes there are no road markings, and the driver simply has to take care not to stray into a lane of oncoming traffic. Sometimes the lane markings change along a particular section of road. For example, when work is being done to a road, the lanes may be narrowed relative to their normal configuration. Lanes may also separate from one another or come together, for example with entrance and exit lanes for roads.

In an autonomous driving situation, it is of paramount importance that the system knows where the lanes are located and in which lane the vehicle is travelling. Using such lane information, an autonomous driving system may be able to control the ego vehicle to remain within a particular lane. Evidently, where lane-change maneuvers are required, knowledge of the lane locations is also required.

Knowledge of which lane the ego vehicle is travelling in is also important for driving assistance systems, for example in monitoring the behavior of other vehicles on the road.

It will be appreciated that an autonomous driving system may correspond generally to a more advanced driver assistance system. Thus, whilst the following discussion focusses on driver assistance systems, the intention is that the present invention is also readily applicable to an autonomous driving system.

Satellite geolocation systems are commonly used in a variety of contexts, including automotive systems, to measure the location of a receiver. An example of such a system is the Global Positioning System (GPS). A measured location determined using a satellite geolocation system has an uncertainty. Often times, and in particular with satellite geolocation systems that are suitable for mass production and affordable use, the uncertainty can be approximately 5-10 metres. Typically, a lane on a road is between 2.5 and 4.5 metres wide. Thus, a geolocation measurement from a typical satellite geolocation system may have an uncertainty of such a magnitude that a driver assistance/automated driving system may not be able to determine the lane in which lane the ego vehicle is likely located.

For many driver assistance functionalities, and for an autonomous driving system, accurate knowledge of the geolocation of the ego vehicle is important.

It is an object of the invention to provide an improved driver assistance system and method of operating a driver assistance system, which seeks to address some or all of these issues.

According to a first aspect, there is provided a driver assistance system for an ego vehicle, the system being for refining a coarse geolocation measurement of the location of the ego vehicle, the system being configured to perform at least one measurement of the visual appearance of each of at least one static feature located in the vicinity of the ego vehicle; using the at least one measurement, calculate a relative position of the at least one static feature and the ego vehicle; using a map, identify a real-world location of each of the at least one static feature; calculate a static feature measurement of the location of the ego vehicle using the relative position of the static feature and the ego vehicle and the real-world location of the at least one static feature; combine the course geolocation measurement of the location of the ego vehicle with the static feature measurement of the location of the ego vehicle to form a fine geolocation position.

The driver assistance system may be an apparatus.

Preferably, each of the at least one static feature is located within an uncertainty margin of the course geolocation measurement.

Conveniently, the system is further configured to use the at least one measurement of each of two or more static features in the calculation of the static feature measurement of the location of the ego vehicle.

Advantageously, at least one static feature is a transition between a dashed line marking region and solid line marking region of the road on which the ego vehicle travels.

Preferably, the system is further configured to using the fine geolocation position, calculate a traffic lane along which the ego vehicle is most likely to be travelling.

Conveniently, the system is further configured to determine a sub-region of the map in which to identify a real-world location of each of the at least one static feature.

Advantageously, the sub-region is based on an uncertainty margin of the course geolocation measurement.

Preferably, the system is further configured to determine whether or not the at least one static feature is identified uniquely within the sub-region of the map.

Conveniently, if the at least one traffic static feature is not identified uniquely, the system is configured to wait to receive at least one measurement of the visual appearance of each of at least one further static feature located in the vicinity of the ego vehicle.

Advantageously, the system further includes an inertial measurement unit ("IMU") that is configured to measure at least one ego vehicle motion parameter.

Preferably, the at least one ego vehicle motion parameter is used in determining a position of the ego vehicle when a predetermined period of time has elapsed since the calculation of the most static feature measurement.

Conveniently, the coarse geolocation measurement includes an ego vehicle latitude, an ego vehicle longitude, and an ego vehicle heading.

Advantageously, the driver assistance system is an autonomous driving system.

According to a second aspect, there is provided a method for a driver assistance system for an ego vehicle, the method being for refining a coarse geolocation measurement of the location of the ego vehicle, the method including the steps of performing at least one measurement of the visual appearance of each of at least one static feature located in the vicinity of the ego vehicle; using the at least one measurement, calculating a relative position of the at least one static feature and the ego vehicle; using a map, identifying a real-world location of each of the at least one static feature; calculating a static feature measurement of the location of the ego vehicle using the relative position of the static feature and the ego vehicle and the real world location of the at least one static feature; combining the course geolocation measurement of the location of the ego vehicle with the static feature measurement of the location of the ego vehicle to form a fine geolocation position.

BRIEF DESCRIPTION OF THE DRAWINGS

So that the invention may be more readily understood, and so that further features thereof may be appreciated, embodiments of the invention will now be described by way of example with reference to the accompanying drawings in which.

DETAILED DESCRIPTION

Figure 1:
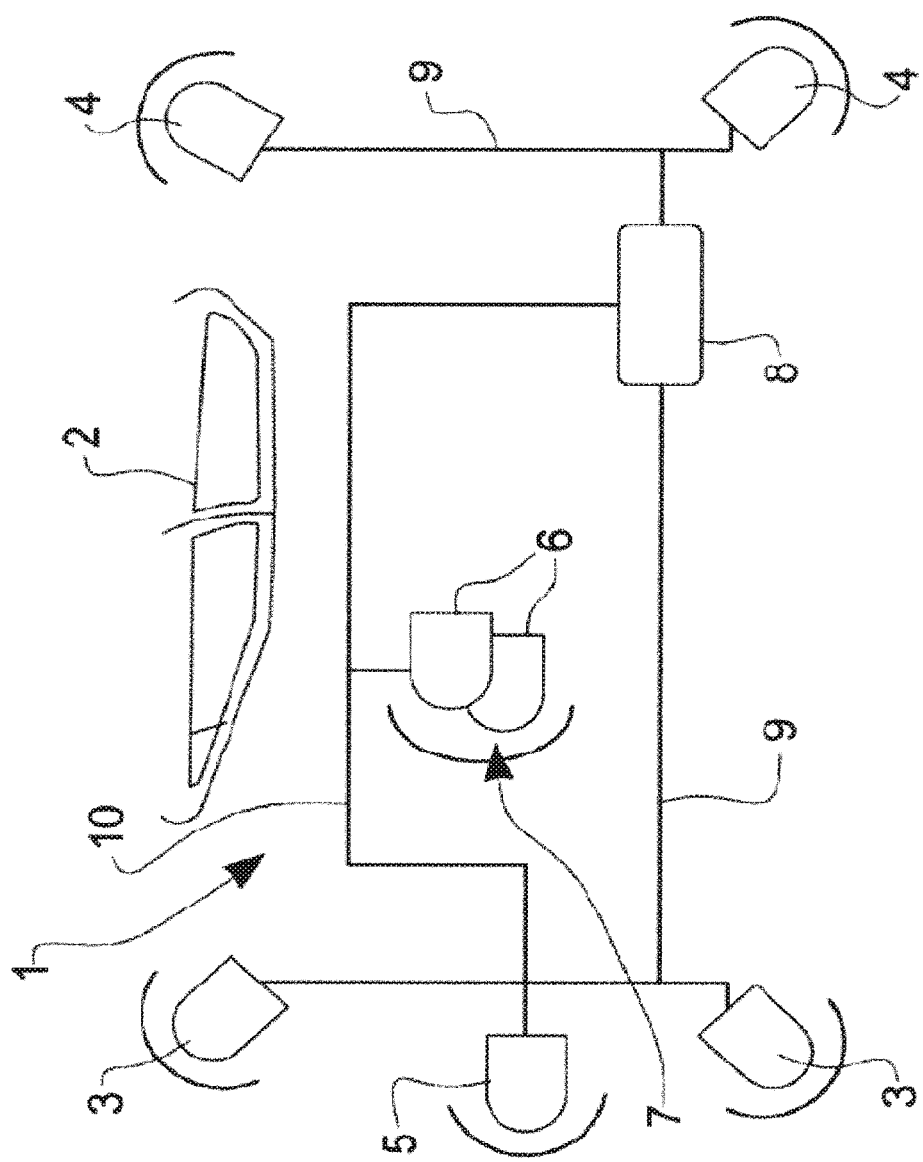
FIG. 1 shows a vehicle including an example driver assistance system.
Figure 2:
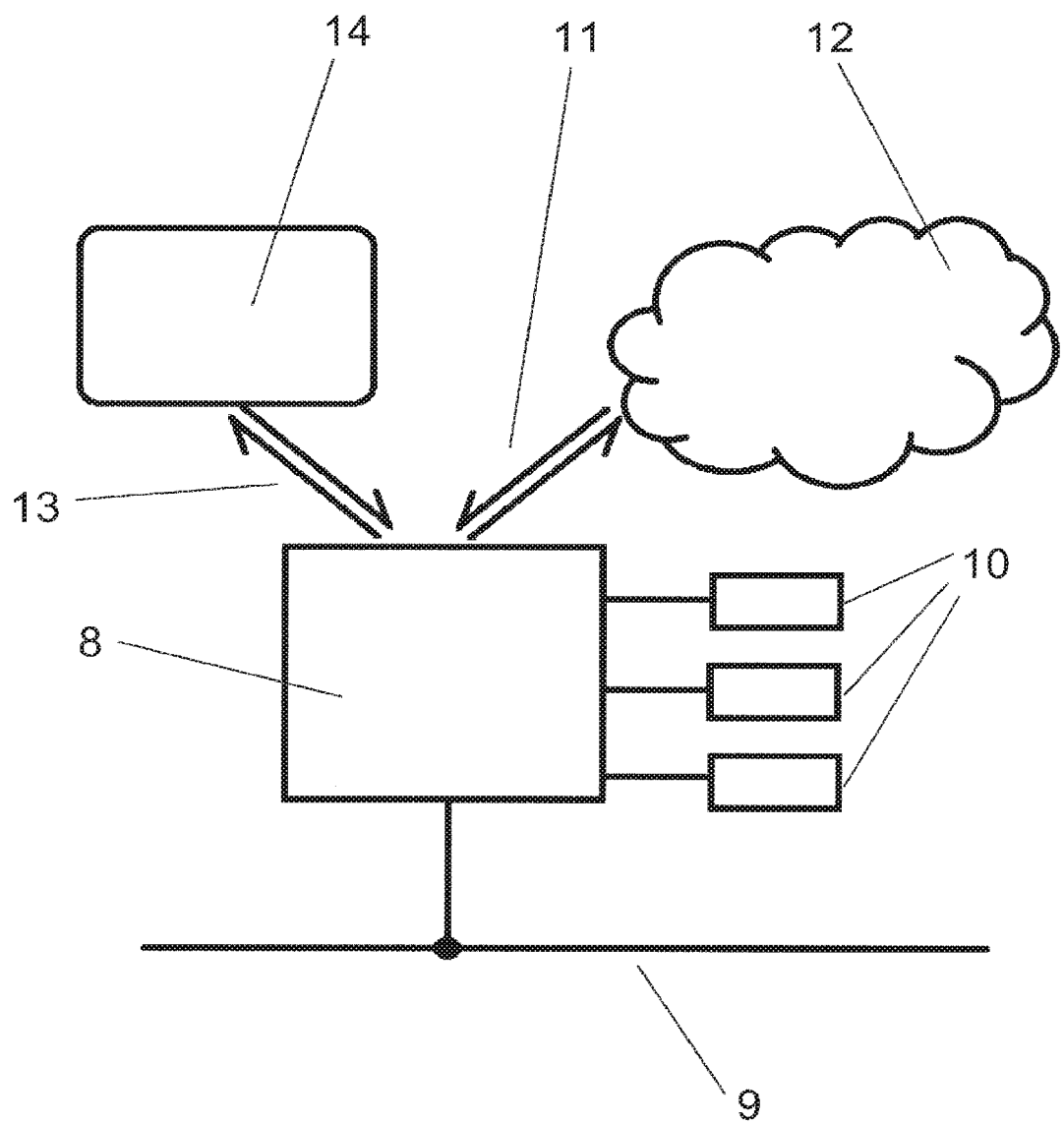
FIG. 2 shows an example of an electronic control unit used in an embodiment of the present invention.

Turning now to consider FIG. 1 in more detail, there is illustrated a schematic representation of an exemplary driver assistance system 1 installed in an ego vehicle 2 (only one side panel of which is denoted in FIG. 1 to indicate the vehicle's orientation). The driver assistance system 1 includes a number of different types of sensor mounted at appropriate positions on the ego vehicle 2. In particular, the system 1 illustrated includes a pair of divergent and outwardly directed mid-range radar ("MRR") sensors 3 mounted at respective front corners of the vehicle 2, a similar pair of divergent and outwardly directed multi-role radar sensors 4 mounted at respective rear corners of the vehicle, a forwardly directed long-range radar ("LRR") sensor 5 mounted centrally at the front of the vehicle 2, and a pair of generally forwardly directed optical sensors 6 (cameras) forming part of a stereo vision system ("SVS") 7 which may be mounted, for example, in the region of the upper edge of the vehicle's windscreen. Referring to FIG. 2, the various sensors 3-6 are operatively connected to a central electronic control system which is typically provided in the form of an integrated electronic control unit 8 mounted at a convenient location within the vehicle. In the particular arrangement illustrated, the front and rear MRR sensors 3, 4 are connected to the central control unit 8 (ECU) via a conventional Controller Area Network ("CAN") bus 9, and the LRR sensor 5 and the sensors of the SVS 7 are connected to the ECU 8 via a faster FlexRay serial bus 9, also of a type known per se.

Collectively, and under the control of the ECU 8, the various sensors 3-6 can be used to provide a variety of different types of driver assistance functionalities such as, for example, blind spot monitoring, adaptive cruise control, collision prevention assist, lane departure protection and rear collision mitigation. Similar sensors may be used in an autonomous driving system.

An example of the system according to the present invention is shown in FIG. 2. The system includes an electronic control unit (ECU) 8 of the type shown in FIG. 1. A particular ego vehicle may include a plurality of such ECUs 8. The ECU 8 is connected to an ego vehicle communication network 9 within the ego vehicle. The ego vehicle communication network 9 may be a CAN bus or a FlexRay system, for example. A particular ECU 8 may be connected to more than one such network, which may not be of the same type. The ECU may communicate with other ECUs in the ego vehicle via the ego vehicle communication network 9.

The ECU 8 is connected to at least one sensor 10. In the example shown in FIG. 2, three sensors 10 are connected to the ECU 8, although this number of sensors should not be considered limiting. The connections of each of the sensors 10 to the ECU 8 may be wired or wireless. The sensor connections may also be via the ego vehicle communication network 9. The connection between each sensor 10 and the ECU 8 may be a two-way connection; that is, the ECU 8 may receive data from the sensor 10 and the ECU 8 may send data and or commands to the sensors 10. The sensors 10 may be providing information concerning the state of the ego vehicle itself and/or the state of the surrounding environment. The sensors 10 may also provide some data reduction capability; that is determined parameters may be calculated at the sensors 10 and sent to the ECU 8 from the sensors 10, rather than (or in addition to) the sensors 10 sending raw measurements performed by the sensors 10 to the ECU 8.

The ECU 8 is also capable of wireless communication with the internet across a 2-way internet communication link 11. The internet includes a cloud computing capability 12, to which the ECU 8 may offload processing tasks. The internet communication link 11 may include a connection to a mobile telephone communications network, for example. The ECU 8 may send processing tasks to the cloud 11 over the internet communication link 11, where the processing task is performed in the cloud 11, before the results of the processing task are sent back to the ECU 8 over the internet communication link 11.

The internet communication link 11 may also provide access to data that is not available immediately to the ECU 8. Such data may include map data, for example.

The ECU 8 also has a second communication link 13, which provides access to a distributed functionality 14 external to the ego vehicle. The distributed functionality may include Vehicle-to-Vehicle communications, and/or Vehicle-to-Infrastructure communications. These may permit driver assistance functionality and/or autonomous driving functionalities in which information can be shared with the ego vehicle, or to which the ego vehicle can share information across the second communication link 13.

Figure 3:
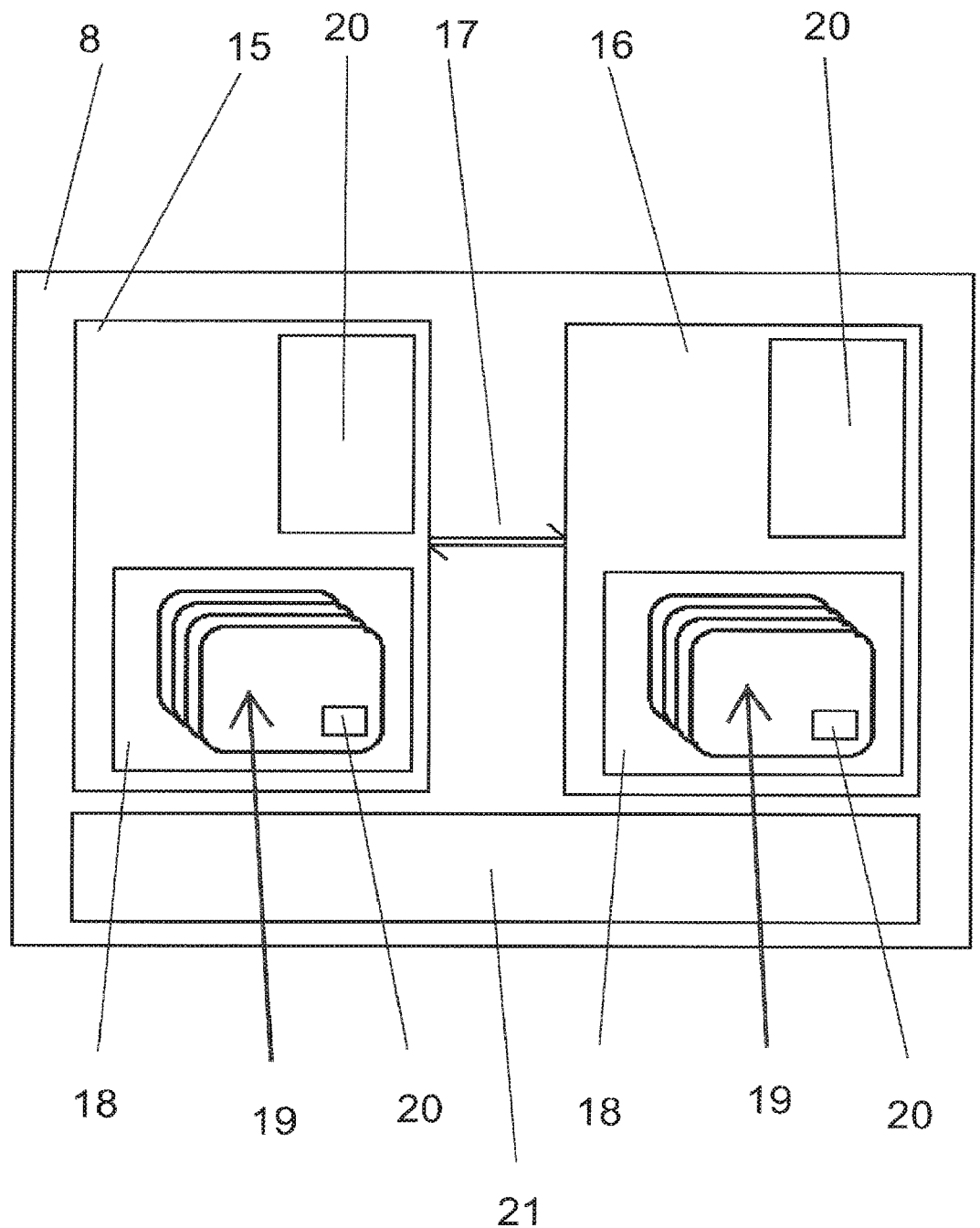
FIG. 3 shows an example of a schematic of the electronic control unit of FIG. 2.

FIG. 3 shows an example schematic architecture of the ECU 8. The ECU 8 includes a master microcontroller unit (MCU) 15 and a slave MCU 16. In general, the operations of the slave MCU 16 are controlled by the master MCU 16. Control commands and data can be exchanged between the master MCU 15 and the slave MCU 16 across the two-way MCU interconnection 17. The ECU schematic in FIG. 3 includes two MCUs; the master MCU 15 and the slave MCU 16; although an ECU 8 in accordance with the present invention could equally include more than two MCUs, or one MCU.

Each of the master MCU 15 and the slave MCU 16 include a processor 18. Each processor 18 is a so-called multicore processor, which includes a plurality of processing cores 19. As will be appreciated, a multicore processor may include, for example, 2, 4, 8, 16, or more, processing cores. Hundreds or thousands of processing cores are also considered. As such, the present invention should not be limited to the number of cores, which will surely increase as processor technology develops.

Each processing core 19 of the multicore processor may include a core memory 20. The processing cores 19 allow for parallel processing within the processor 18.

Each of the processors 18 may also include a processor memory (not shown). The processor memory may be shared by the processing cores 19 in the respective processor 18.

The ECU 8 includes an ECU memory 21, which is shared by the MCUs in the ECU (the master MCU 15 and the slave MCU 16, in the example of FIG. 3). The ECU 8 may also be connected to a non-volatile data storage device (not shown), for example a flash device, a ROM unit, or a hard-drive. The data storage may also be located remotely, and be accessed via the internet, for example.

Figure 4:
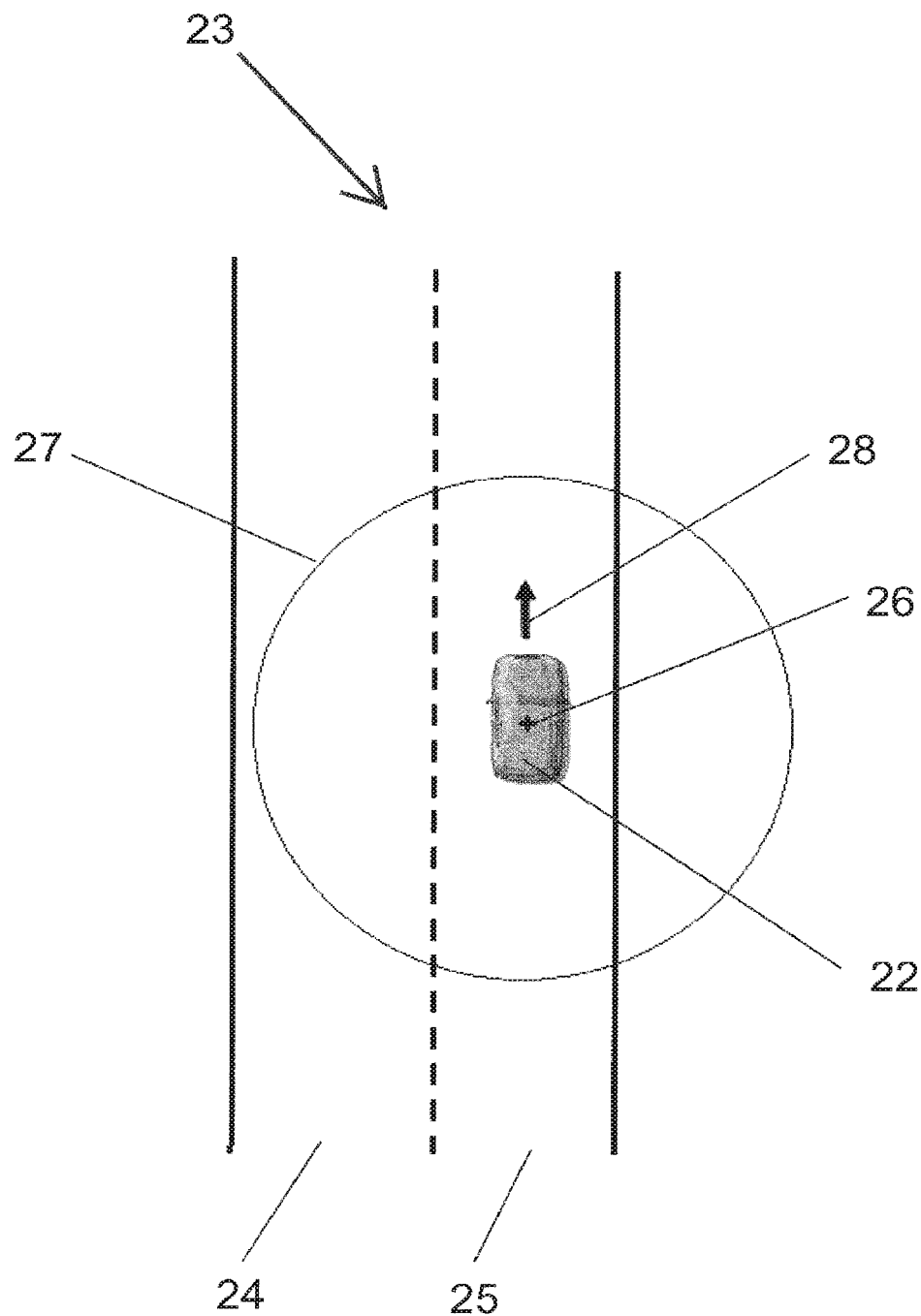
FIG. 4 shows a first driving scenario for a vehicle including a driver assistance system according to the present invention.

FIG. 4 shows a bird's eye view schematic of a first ego vehicle driving scenario. The ego vehicle 11 includes the driver assistance system 1 of the vehicle 2 shown in FIG. 1. The system may include an ECU 8 as shown in FIGS. 2 and 3.

In the scenario shown in FIG. 4, the ego vehicle 22 is travelling along the road 23. The road 23 has two lanes 24, 25. The traffic in the two lanes 24, 25 travels in opposite directions along the road 23. In FIG. 4, the ego vehicle 22 is shown driving on the right, and so is located in the right-most lane 25, as shown.

The ego vehicle 22 is equipped with a GPS receiver, which corresponds to an example of a sensor 10. Using the GPS receiver a coarse geolocation measurement 26 of the ego vehicle 22 is made; in FIG. 4 the course geolocation measurement 26 is indicated by the marker. There is also an associated uncertainty of the coarse geolocation measurement 26, which is indicated by the extent of the uncertainty 27 surrounding the coarse geolocation measurement 26 (also referred to as the "uncertainty margin"). In FIG. 4, the extent of the uncertainty is indicated by a circle; however, the uncertainty in a geolocation measurement may be non-circular. By way of example, the uncertainty may correspond to an area approximately 10 metres across.

As will be appreciated, the uncertainty is simply a parameterisation of the probability distribution of the course geolocation measurement 26. The uncertainty 27 may correspond, for example, to a confidence level, e.g. the 1-, 2-, or 3-sigma confidence level, where sigma is the standard deviation of the coarse geolocation measurement 26. This is merely an example, and the skilled person will appreciate that there are many ways in which to represent the uncertainty of a measurement. The uncertainty may be represented by a covariance matrix, and therefore correspond to a variance of the measurement.

In the schematic of FIG. 4, it can be seen that the uncertainty 27 extends into the left-most lane 24 of the road 23, and to the right of the right-most lane 25 in which the ego vehicle 22 is travelling. The uncertainty 27 also extends in front of, and behind, the ego vehicle 22. Thus, using the GPS receiver there is an uncertainty 27 about where on the road 23 the ego vehicle 22 is located.

In other words, at this stage in the methodology, there is a coarse GPS measurement of the location of the ego vehicle 16, which is sufficiently uncertain that using the coarse GPS measurement alone makes it impossible to determine reliably in which lane of the road 23 the ego vehicle 22 is travelling. There is an uncertainty 27 in the coarse GPS position 26 in a longitudinal sense; that is, there is a longitudinal uncertainty in the location of the ego vehicle 22 along the road 23, and; there is an uncertainty in the coarse GPS position 26 in a transverse sense; that is, there is an uncertainty of the position of the ego vehicle 26 across the width of the road 23.

The direction of travel of the ego vehicle 22 is indicated by the arrow 28. The direction of travel 28 may correspond to a heading of the ego vehicle 22. The heading of the ego vehicle 22 may be calculated using the GPS receiver.

It is desirable to improve the accuracy of the coarse GPS measurement 26. In particular, it is important to know more accurately the location of the ego vehicle 22 in a longitudinal sense, so the driver assistance system can perform maneuvers (for example) at the correct position along the road 23. It is also important to know more accurately the location of the ego vehicle 22 in a transverse sense, so that the driver assistance system can determine in which lane 24, 25 of the road 23 the ego vehicle 22 is travelling. A more accurate location for the ego vehicle 22 is also useful for other driver assistance/autonomous driving system functionalities.

In the present embodiment, a fine geolocation position is calculated according to the following methodology, which is implemented by the driver assistance system. The fine geolocation position has a smaller uncertainty than the coarse geolocation measurement 26, and is thus more reliable than the coarse geolocation measurement 26. In particular, the fine geolocation position may have a smaller longitudinal uncertainty and/or a smaller transverse uncertainty.

Figure 5:
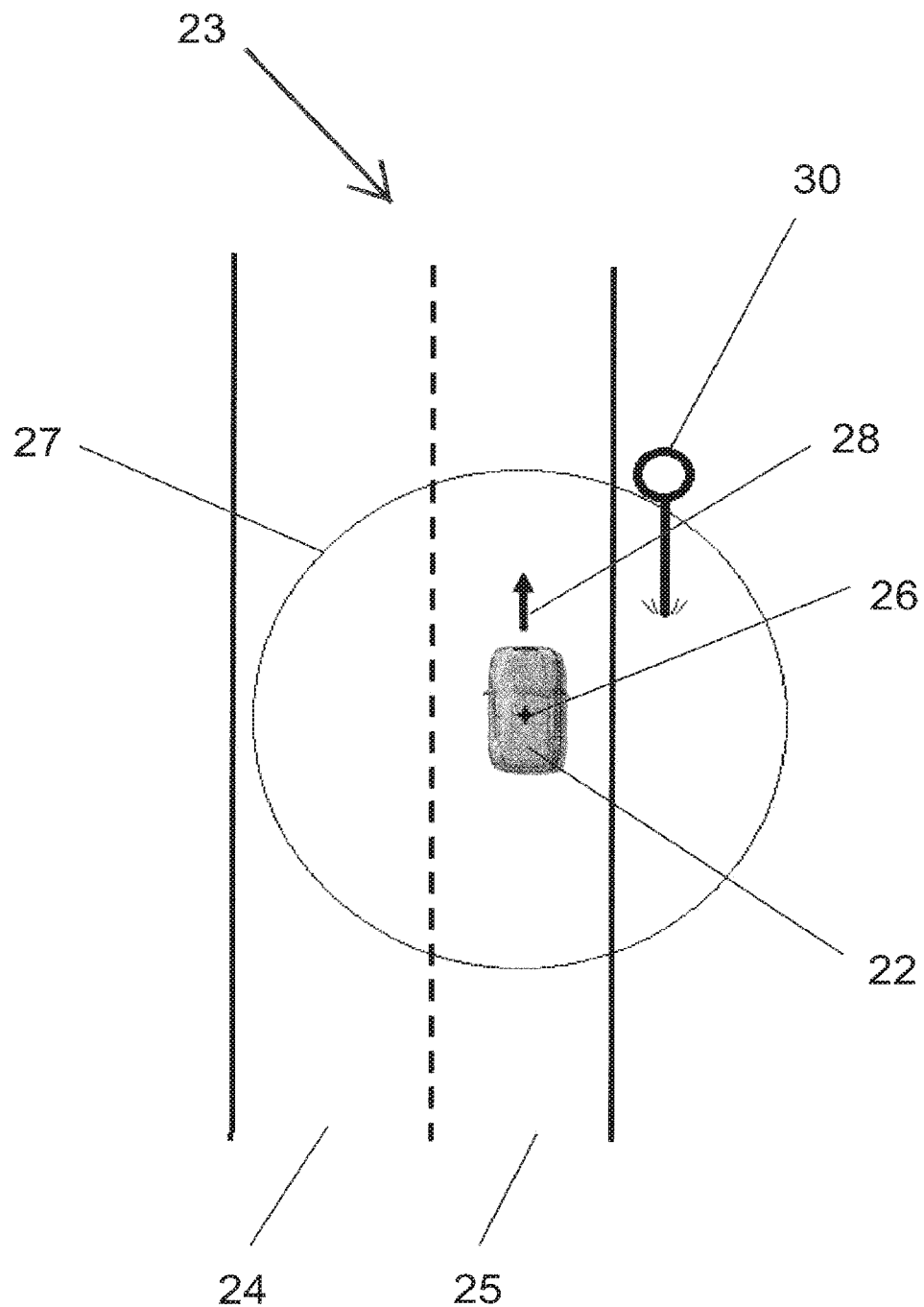
FIG. 5 shows a second driving scenario for a vehicle including a driver assistance system according to the present invention.

FIG. 5 shows a bird's eye view schematic of a second ego vehicle driving scenario. Elements in FIG. 5 that are also shown in FIG. 4 are labelled with the same reference numerals to avoid duplication. Description of those elements will also not be duplicated herein.

Also shown in FIG. 5 is a road sign 30, which is a first example of a static feature. The sign 30 is shown as flat (against the page) in FIG. 5, however this is for convenience of representation only. It will be appreciated that the sign 30 is intended to represent a sign that effectively protrudes upwardly from the ground upon which the road is located, in the conventional manner of road signage.

The sign 30 is located at a position adjacent to the road 23. As will be appreciated, the sign 30 may be located directly at the edge of the road 23, or may be transversely set back from the edge of the road 23. In the latter case, there may be a "hard-shoulder" or emergency lane located between the sign 30 and the outermost lane intended for ordinary traffic use.

Road signs, as examples of static features, could alternatively be located on an overhead gantry, for example, or any other convenient location in which road signs are typically located; what is important is that the static feature is visible to sensors mounted to the ego vehicle 22, as will be described in more detail below.

Figure 6:
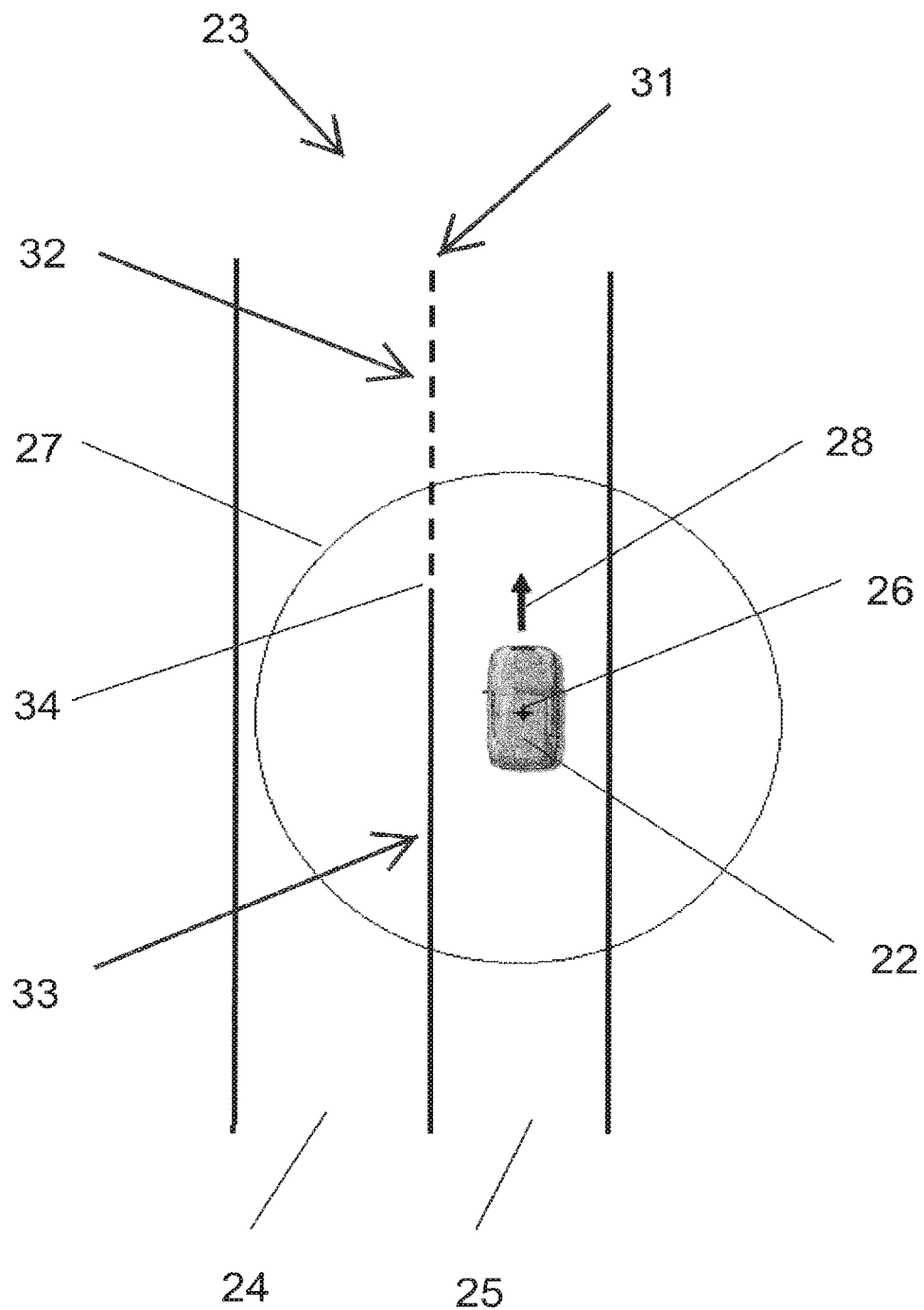
FIG. 6 shows a third driving scenario for a vehicle including a driver assistance system according to the present invention.

FIG. 6 shows a bird's eye view schematic of a second ego vehicle driving scenario. Elements shown in FIG. 6 that are also shown in FIG. 5 are labelled with the same reference numerals to avoid duplication. Description of those elements will also not be duplicated herein.

As shown in FIG. 6 the lanes 24, 25 are delineated by a separating road marking 31. The separating road marking 31 has a dashed line portion 32 and a solid line portion 33. A line marking transition point 34 is a location at which there is a transition between the dashed line portion 32 and the solid line portion 33. In the schematic of FIG. 6, the ego vehicle 22 encounters the solid line portion 33 before encountering the dashed line portion 32 as the ego vehicle 22 travels along the right-most lane 25. However, it will be appreciated that the situation could be the opposite, i.e. that the ego vehicle 22 could encounter a dashed line portion 32 that transitions to a solid line portion 33. Indeed, if the ego vehicle 22 were travelling in the opposite direction along the road 23, in left-most lane 24, then that is precisely what would happen.

In either case, the line marking transition point 34 is a second example of a static feature that is visible to sensors mounted to the ego vehicle 11.

As well as these two specified examples of static features suitable for use by the embodiment (sign 30 and line marking transition point 34), there are many other suitable static features.

For example, a post adjacent to the road, a bridge, a tunnel entrance, a building or other landmark would all be suitable as a static feature.

Furthermore, other visibly identifiable road marking features formed on the road are also suitable static features. For example, the convergence point of linear road markings, the divergence point of linear road markings, or the transition point from a first road-marking regime to a second, different, road-marking regime.

A start and/or end point of a single road marking may also be used as a static feature. For example, a dashed lane marking portion may constitute a plurality of sequential linear dashes in the conventional manner. Each linear dash (forming a single road marking) may have a dash start point and a dash end point. The words "start" and "end" in this context are used in the sense of the order in which the two ends of the dash are encountered by the travelling ego vehicle. Each of the dash start point and the dash end point (of a particular dash) may be used as a static feature in accordance with the present invention. Furthermore, each of the dash start point and dash end point of a plurality of dashes may be used as static features as the dashes are encountered by ego vehicle as it travels along the road.

The ego vehicle 22 includes a camera system. The camera system may include a mono-camera (i.e. one point of view) or a stereo camera (i.e. two points of view). Camera systems with more than two points of view may also be used. The camera system is another example of a sensor 10.

In general, using the camera system, at least one image of a scene that is encountered by the ego vehicle 22 is produced. The camera(s) of the camera system generally may be forward facing (corresponding to normal forward driving direction of the vehicle) and so the camera system can form images of the scene in which a static feature 30, 34 is located as the ego vehicle 22 travels along the road. By making at least one measurement of the visual appearance of the static feature 30, 34 in the image, the embodiment is configured to calculate the position of the static feature relative to the ego vehicle 22. Such measurements may include apparent position, angular size, and/or shape of the static feature 30, 34 as detected in the image. The system may include knowledge of a standard, real world, size and/or shape of the static feature 30, 34.

As well as using a single image for this relative position calculation, a sequence of images from the camera system may be used to determine the relative position of the static feature 30, 34. This may allow for a more accurate determination of the position of the static feature 30, 34 relative to the ego vehicle 22 because the apparent position, size and/or shape of the static feature 30, 34 will change in the view of the camera system as the ego vehicle 22 moves.

Having been identified in an image (or sequence of images) from, or using, the camera system, the static feature 30, 34 is identified in a map. The map includes the real-world location of that static feature 30, 34. Such a real-world location may include a latitude and longitude of the static feature 30, 34. The map may be a so-called high-definition map that includes more information than a simple map. This process of identifying the static feature 30, 34 in a map is described below.

The map may be stored in the non-volatile data storage device discussed above. Alternatively, the map data may be accessed via the internet. Alternatively, the map data may be partially stored in the non-volatile storage device or the ECU memory 21 in the manner of cached content, for example.

The coarse GPS measurement 26, and optionally the uncertainty 27 of the coarse GPS measurement, is used to define a sub-region of the map in which to search for the static feature 30, 34. The sub-region of the map may be the uncertainty/variance 27 of the coarse GPS measurement 26, or may be defined using the uncertainty/variance 27. In FIGS. 5 and 6, the sub-region of the map may thus correspond to the area circumscribed by the uncertainty 27.

Within the sub-region of the map, the system is configured to search for a uniquely identified record of the static feature 30, 34. If, for example, within the sub-region, two records of two distinct potential matches for the static feature 30, 34 are found, then it may be impossible to identify in the map which of those two records corresponds to the static feature 30, 34 identified by, or from, the camera system. If it is not possible to identify uniquely the detected static feature 30, 34 in the sub-region of the map, then the system may wait for a predetermined time period before attempting the processing steps again. With the predetermined time period having elapsed, the scene visible to camera system will have changed as the ego vehicle 22 has moved along the road, and a different static feature 30, 34 may be in the field of view of the camera system. The above methodology can then be repeated for that further static feature 30, 34.

Particularly for dash start points and/or dash end points as the potential static features, it may not be possible to find a uniquely identified record of a start point and/or end point in the sub-region of the map. In this situation, a primary static feature may be used to initialize the location of the ego vehicle, which enables the detection and measurement of secondary static features. In other words, detection and measurement of secondary static features support the position derived for the ego vehicle as the ego vehicle travels between primary static features. Occurrence of the primary static features may be relatively rare when compared to the occurrence of the secondary static features as the ego vehicle travels along a road. In other words, the primary static features may be relatively rare static features, for example road signs or lane marking transition points. The secondary static features may be relatively common static features, for example dash start points and/or end points.

Two or more static features 30, 34 may be identified and measured by the camera system. For example, if two static features 30, 34 are detected and measured simultaneously by the camera system, then the chance of being unable to find a unique pair of records within the sub-region of the map that corresponds to those two static features 30, 34 is reduced compared to that for a single static feature. Of course, a greater number still of static features 30, 34 will reduce further still the chances of being unable to identify uniquely the combination of the static features 30, 34 located within the sub-region. An improved accuracy is also achieved with larger angular separations between static features, as observed by the camera system. The system may be configured to identify static features with maximal angular separation.

Where there are two or more static features 30, 34, they may include different types of static feature; for example, a first static feature may be a line marking transition 34 and a second static feature may be a road sign 30.

When the static feature(s) is/are identified uniquely in the sub-region of the map, then the real-world location of each static feature 30, 34 is gathered from the map. The real-world location of each static feature 30, 34 is thus known to the system.

Figure 7:
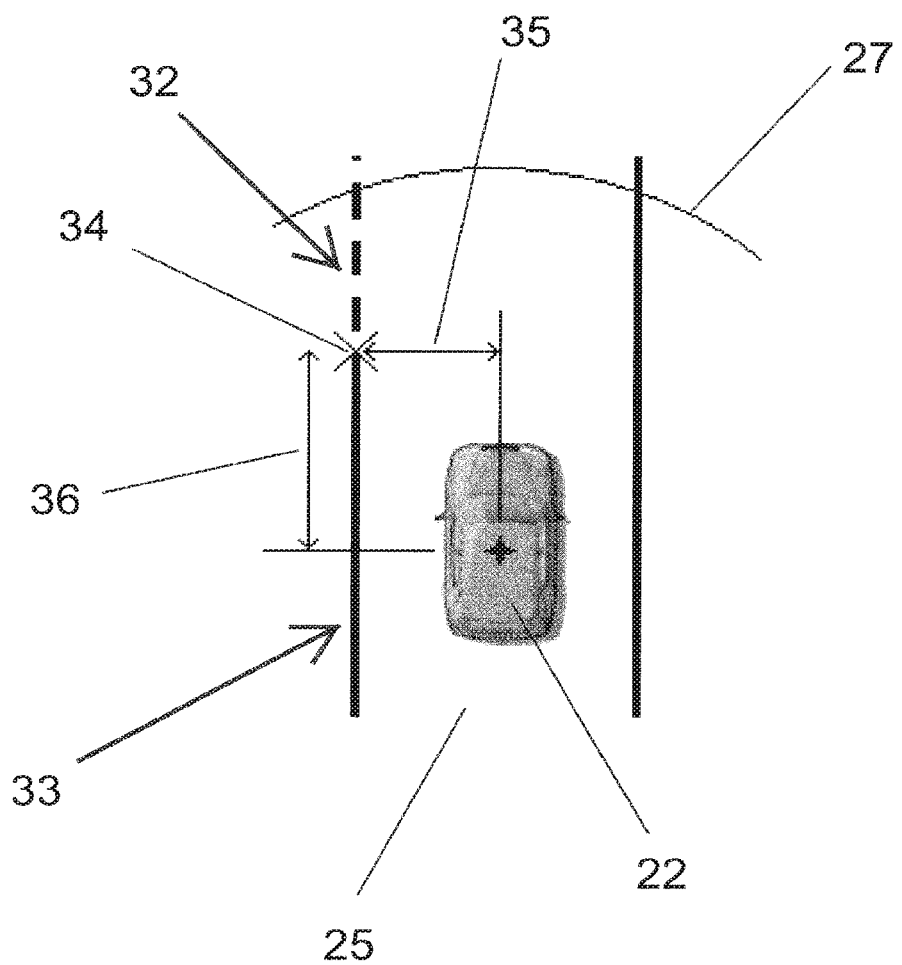
FIG. 7 shows an enlarged view of the third driving scenario.

FIG. 7 shows an enlarged view of the scenario shown in FIG. 6. Elements shown in FIG. 7, which are also shown in FIG. 6, are labelled with the same reference numerals to avoid duplication. Description of those elements will also not be duplicated herein. Only a portion of the uncertainty 27 is shown in FIG. 7.

The real-world location of the line marking transition 34 is gathered from the map having been identified uniquely in the sub-region of the map. The relative position of the ego vehicle 22 and the line marking transition 34 is calculated using the measurement(s) of the visual appearance of the line marking transition 34, as described above.

As an aside, it will be apparent that the embodiment uses a predetermined fixed point on the ego vehicle 22 as the origin of its frame of reference. In this case, the origin is taken to be the center of the ego vehicle 22, as shown in FIG. 7. However, it will be appreciated that the choice of origin is a mathematical convenience, and is, in effect, inconsequential.

In any case, in FIG. 7 the relative position between the ego vehicle 22 and the line marking transition 34 is broken down into a transverse component 35 and a longitudinal component 36. A position of the ego vehicle 22 is therefore calculated by using the real-world location of the line marking transition 34 and the relative position of the ego vehicle 22 and the line marking transition 34 (as calculated from the appearance of the line marking transition 34 to the camera system on the ego vehicle 22). This is referred to as the "static feature measurement" of the location of the ego vehicle 22.

Where two or more static features 30, 34 are identified, then a static feature measurement of the location of the ego vehicle 22 can be derived for each of the static features 30, 34. Such measurements may be combined to form a single combined static feature measurement of the location of the ego vehicle 22.

At this stage of the methodology, the position of the ego vehicle 22 is known via two independent methods. The first is the coarse geolocation measurement using the GPS receiver; the second is the position calculated using the ego vehicle position relative to the static feature 30, 34 (the real world position of which is known from the map). In general, the latter of these positions is more accurate than the former. However, regardless of the accuracy of either method, because two independent position measurements have been made, those measurements may be combined (or "fused") to form a fine geolocation position. The fine geolocation position may be more accurate than either of the measurements from which it is formed. The fusing of the positions may be performed by incorporating the position calculated using the ego vehicle position relative to the static feature as a measurement of the state of the ego vehicle (corresponding to the coarse position measurement of the ego vehicle) into the state of the of the ego vehicle. Such fusing may be achieved by using a Kalman filter to update the state of the ego vehicle to incorporate the position calculated using the ego vehicle position relative to the static feature. The Kalman filter may be an unscented Kalman filter. See the discussion of in connection with FIG. 8 for more detail.

The fine geolocation position may then be used for a variety of downstream driving aids, or in an autonomous driving system/functionality.

The fine geolocation position determination may be performed repeatedly as the ego vehicle 22 travels along a road. An accurate geolocation of the ego vehicle may therefore be maintained for use in the system by constantly updating that position with static feature measurements of the location of the ego vehicle 22 as they are calculated as the ego vehicle 22 drives down a road.

In the absence of further location measurement inputs from static features 30, 34, or between static features 30, 34, there may be a drift in the accuracy of the position of the ego vehicle 22 per vehicle length travelled. Such a drift may be a drift in location of 1-2% from the true real world location, for example. Using an inertial measurement unit (IMU) and the fine geolocation position at an earlier time as a starting point, the system can, by using measurements of the motion of the vehicle from the IMU, calculate a later location of the ego vehicle at a later time. The IMU is another example of a sensor 10.

A later time location measurement as determined using an IMU may also be fused with the coarse geolocation measurement in the same manner as the static feature measurement of the location of the ego vehicle. Again, such use of an IMU may improve the geolocation measurement performance of the driver assistance system.

By including the IMU functionality, the system is also more resilient insofar as an accurate geolocation of the ego vehicle 22 may be maintained even in the absence of static features to measure and use, as above. The IMU may measure, for example, the yaw-rate and/or the speed of the ego vehicle 22, which can be used to calculate the position to which the ego vehicle 22 has moved since the last geolocation measurement.

Figure 8:
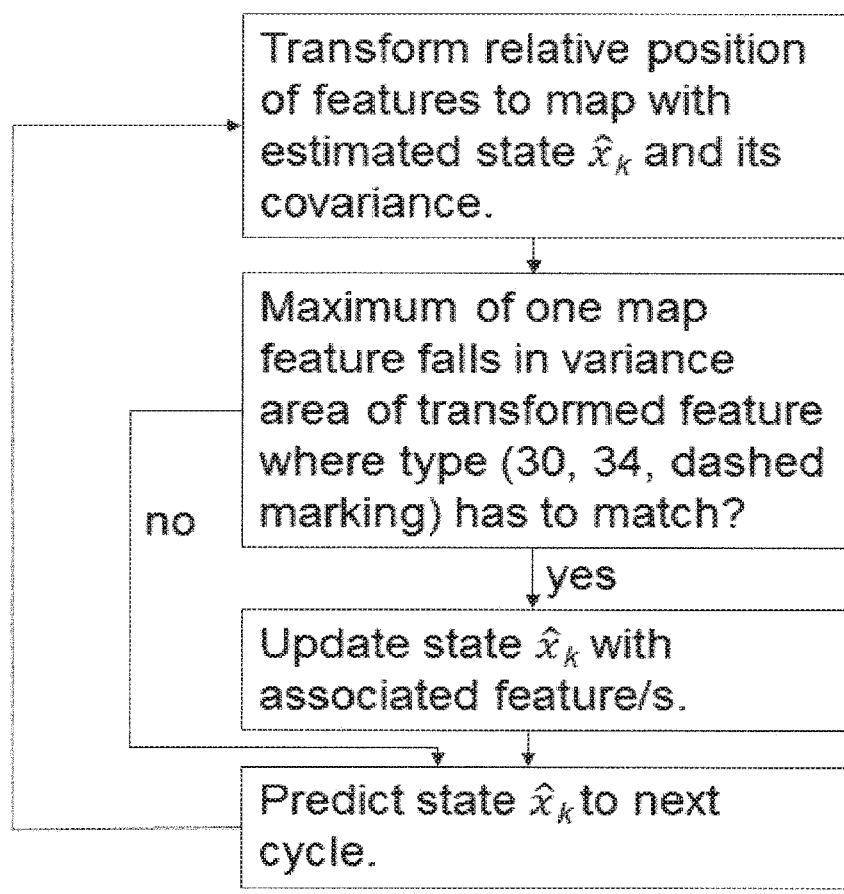
FIG. 8 illustrates a methodology of using a fine geolocation position.

FIG. 8 illustrates a schematic method in accordance with an embodiment of the present invention.

In the method of FIG. 8, any and all detected static features that are identified and measured by the camera system are transformed into to map co-ordinates. For each detected static feature, this transformation is performed using a current state of the ego vehicle state xk, and the position of the detected static feature relative to the ego vehicle.

The ego vehicle state xk includes at least:

$Lat_{GPS}$ latitude of coarse geolocation measurement;

$Long_{GPS}$ longitude of coarse geolocation measurement; and $a_{GPS}$ heading of coarse geolocation measurement.

It is then determined whether there is only one (i.e. a maximum of one), or more than one, static feature identified within the sub-region of map. The sub-region of the map may correspond to the variance of the ego vehicle state.

If there is only static feature located in the variance area of the map and the type of feature matches with a detected and measured static feature, then the "yes" path is taken. The matching of the feature type means the checking of the type of the feature detected by the camera and the potential match for that feature in the map. For example, if the camera detects a road sign, then it is checked that there is only one static feature of a Type equal to "road sign" in the sub-region of the map. The state of the ego vehicle is then updated using the unscented Kalman filter to incorporate the static feature measurement of the positon of the ego vehicle derived from the measurement of the static feature and the map. A prediction for a future state of the ego vehicle is also made based on a predictive model using the unscented Kalman filter.

According to this method, the state is refined to include position measurements derived from a static feature each time that a static feature is uniquely identified. The covariance of the state may also be refined at the same time. The present inventors have noted that the unscented Kalman filter is particularly useful as the state estimator in this case. This is because of highly non-linear state observation and transition models required to predict a future state of the system from a current or previous state. The unscented Kalman filter is capable of describing highly non-linear systems without introducing large errors.

If there is more than one static feature located in the variance area of the map, or there is only one static feature but it does not match with the type of the detected static feature, then the "no" path is taken. A prediction for the state of the ego vehicle is then made based on a predictive model using the unscented Kalman filter. In this case, however, no static feature measurement of the positon of the ego vehicle derived from the measurement of the static feature is available, and thus it is not incorporated into the state of the ego vehicle.

However, it will be appreciated that incorporating into the state of the ego vehicle a static feature measurement of the positon of the ego vehicle may improve the accuracy of the state and may reduce the size of the variance of the state. The sub-region of the map in which to identify the static features may correspond to the variance of the state. In turn therefore, the sub-region of the map is made smaller by making and including in the state the static feature measurement of the positon of the ego vehicle. This reduction in the size of the sub-region means increases the likelihood that more commonly occurring static features may be uniquely identified in the sub-region of the map.

For example, the coarse measurement of the state of the ego vehicle (measured by the GPS) may be initialized by a detection and measurement of a primary static feature, for example, a relatively rare static feature (such as a road sign or line marking transition). As above, this improves the accuracy of the state of the ego vehicle and reduces the size of the variance of the state, thus reducing the size of the sub-region of the map in which to search for static features. In turn, this may allow a secondary static feature to be detected and measured to refine further the state of the ego vehicle, for example a relatively common static feature. For example, a relatively common static feature may be dash start points and/or dash end points.

The use of secondary static features (e.g. relatively common static features) to improve and maintain the accuracy of the state is thus possible between the detections and measurements of primary static features (e.g. relatively rare static features).

The relative rarity and commonality of the relatively rare and relatively common static features described above refers to the chances of encountering said static features by the ego vehicle as the ego vehicle travels along a particular road. The rarity/commonality of the static features is relative to one another. The relatively common static features have a higher rate of relative occurrence than the relatively rare static features. In other words, along a particular stretch of road, an ego vehicle would expect to pass relatively common static features more often than the ego vehicle would expect to pass the relatively rare static features. For example, relatively common static features may include the start and/or end of single road markings; relatively rare common features may include road signs and/or line marking transition points. The dash start points and/or dash end points of a linear dash may be located with a few metres of each other, whereas road signs may be located within hundreds of metres of each other, for example. Thus, the start and/or end of single road markings would correspond to relatively common static features; the road signs would correspond to relative rare static features.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilized for realizing the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

While the above description constitutes the preferred embodiment of the present invention, it will be appreciated that the invention is susceptible to modification, variation and change without departing from the proper scope and fair meaning of the accompanying claims.

What is claimed is:

1. A driver assistance system comprising:
   an inertial measurement unit configured to measure at least one motion parameter of an ego vehicle;
   a camera configured to capture images of an environment of the ego vehicle; and
   at least one processor configured to:
      receive, from the camera, a first image of at least one static feature located in the environment of the ego vehicle;
      determine a first geolocation position of the ego vehicle based on the at least one static feature and a map;
      receive, from the camera, a second image;
      determine that the second image does not include the at least one static feature;
      in response to the determination that the second image does not include the at least one static feature, determine a second geolocation position of the ego vehicle based on the first geolocation position and the at least one motion parameter; and
      determine at least one driver assistance parameter based on the second geolocation position of the ego vehicle.

2. The driver assistance system of claim 1, wherein the at least one processor is configured to:
   determine a relative position of each of the at least one static feature with respect to the ego vehicle based on the first image;
   determine a real-world location of the at least one static feature based on the map;
   determine a static feature measurement of a location of the ego vehicle based on the relative position of the at least one static feature with respect to the ego vehicle and the real-world location of the at least one static feature; and
   determine the first geolocation position of the ego vehicle based on the static feature measurement.

3. The driver assistance system of claim 2, wherein the at least one static feature comprises a first static feature and a second static feature, and wherein the at least one processor is configured to:
   determine, based on the first image, a first relative position of the first static feature with respect to the ego vehicle and a second relative position of the second static feature with respect to the ego vehicle;
   determine, based on the map, a first real-world location of the first static feature and a second real-world location of the second static feature; and
   determine the static feature measurement of the location of the ego vehicle based on the first relative position, the second relative position, the first real-world location, and the second real-world location.

4. The driver assistance system of claim 1, wherein the at least one processor is configured to determine a sub-region of the map for the at least one static feature.

5. The driver assistance system of claim 4, wherein the at least one processor is configured to determine whether or not a first static feature of the at least one static feature is identified uniquely within the sub-region of the map.

6. The driver assistance system of claim 5, wherein the at least one processor is configured to determine a second static feature of the at least one static feature when the first static feature is not uniquely identified.

7. The driver assistance system of claim 6, wherein the camera is configured to capture a third image, and wherein the at least one processor is configured to determine the second static feature is within the third image.

8. The driver assistance system of claim 1, wherein the at least one static feature is a transition between a dashed line marking region and solid line marking region of a road on which the ego vehicle travels.

9. The driver assistance system of claim 1, wherein the at least one processor is configured to determine a traffic lane along which the ego vehicle is travelling based on the second geolocation position.

10. The driver assistance system of claim 1, wherein the driver assistance system is an autonomous driving system.

11. A method by a driver assistance system comprising at least one processor, the method comprising:
- receiving, from an inertial measurement unit, at least one motion parameter of an ego vehicle;
- receiving, from a camera, a first image of at least one static feature located in an environment of the ego vehicle;
- determining a first geolocation position of the ego vehicle based on the at least one static feature and a map;
- receiving, from the camera, a second image;
- determining that the second image does not include the at least one static feature;
- in response to the determination that the second image does not include the at least one static feature, determining a second geolocation position of the ego vehicle based on the first geolocation position and the at least one motion parameter; and
- determining at least one driver assistance parameter based on the second geolocation position of the ego vehicle.

12. The method of claim 11, comprising:
- determining a relative position of each of the at least one static feature with respect to the ego vehicle based on the first image;
- determining a real-world location of the at least one static feature based on the map;
- determining a static feature measurement of a location of the ego vehicle based on the relative position of the at least one static feature with respect to the ego vehicle and the real-world location of the at least one static feature; and
- determining the first geolocation position of the ego vehicle based on the static feature measurement.

13. The method of claim 12, wherein the at least one static feature comprises a first static feature and a second static feature, the method comprising:
- determining, based on the first image, a first relative position of the first static feature with respect to the ego vehicle and a second relative position of the second static feature with respect to the ego vehicle;
- determining, based on the map, a first real-world location of the first static feature and a second real-world location of the second static feature; and
- determining the static feature measurement of the location of the ego vehicle based on the first relative position, the second relative position, the first real-world location, and the second real-world location.

14. The method of claim 11 comprising determining a sub-region of the map for the at least one static feature.

15. The method of claim 14 comprising determining whether or not a first static feature of the at least one static feature is identified uniquely within the sub-region of the map.

16. The method of claim 15, comprising determining a second static feature of the at least one static feature when the first static feature is not uniquely identified.

17. The method of claim 16, comprising:
- receiving, from the camera, a third image; and
- determining the second static feature is within the third image.

18. The method of claim 11, comprising determining a traffic lane along which the ego vehicle is travelling based on the second geolocation position.

19. An apparatus comprising:
- a memory storing instructions; and
- at least one processor communicatively coupled to the memory and configured to execute the instructions to:
  - receive, from an inertial measurement unit, at least one motion parameter of an ego vehicle;
  - receive, from a camera, a first image of at least one static feature located in an environment of the ego vehicle;
  - determine a first geolocation position of the ego vehicle based on the at least one static feature and a map;
  - receive, from the camera, a second image;
  - determine that the second image does not include the at least one static feature
  - in response to a determination that the second image does not include the at least one static feature, determine a second geolocation position of the ego vehicle based on the first geolocation position and the at least one motion parameter; and
  - determine at least one driver assistance parameter based on the second geolocation position of the ego vehicle.

20. The apparatus of claim 19, wherein the at least one processor is configured to execute the instructions to:
- determine a relative position of each of the at least one static feature with respect to the ego vehicle based on the first image;
- determine a real-world location of the at least one static feature based on the map;
- determine a static feature measurement of a location of the ego vehicle based on the relative position of the at least one static feature with respect to the ego vehicle and the real-world location of the at least one static feature; and
- determine the first geolocation position of the ego vehicle based on the static feature measurement.

* * * * *